US007817823B1

United States Patent
O'Donnell

(10) Patent No.: US 7,817,823 B1
(45) Date of Patent: Oct. 19, 2010

(54) CALCULATING SHADOW FROM AREA LIGHT SOURCES USING A SPATIALLY VARYING BLUR RADIUS

(75) Inventor: Daniel O'Donnell, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 844 days.

(21) Appl. No.: 11/741,554

(22) Filed: Apr. 27, 2007

(51) Int. Cl.
*G06K 9/00* (2006.01)
*G06T 15/50* (2006.01)

(52) U.S. Cl. ...................................... 382/103; 345/426
(58) Field of Classification Search ................. 382/103, 382/211; 345/170, 180, 419, 420, 421, 422, 345/426, 428, 581, 582, 584, 588
See application file for complete search history.

(56) References Cited

U.S. PATENT DOCUMENTS

| 5,808,620 | A * | 9/1998 | Doi et al. ..................... 345/426 |
| 6,704,025 | B1 * | 3/2004 | Bastos et al. ................ 345/589 |
| 6,760,024 | B1 * | 7/2004 | Lokovic et al. ............. 345/421 |
| 6,778,181 | B1 | 8/2004 | Kilgariff et al. |
| 6,791,544 | B1 | 9/2004 | Hong et al. |
| 6,850,243 | B1 | 2/2005 | Kilgariff et al. |
| 6,903,741 | B2 * | 6/2005 | Corbetta ..................... 345/426 |
| 6,919,904 | B1 | 7/2005 | Kilgariff et al. |
| 7,106,326 | B2 | 9/2006 | Deering et al. |
| 2006/0119600 | A1 | 6/2006 | Lokovic et al. |
| 2006/0202941 | A1 | 9/2006 | Morein et al. |
| 2006/0274064 | A1 | 12/2006 | Dougherty et al. |

OTHER PUBLICATIONS

Soler, Cyril and Francois X Sillion, "Fast calculation of soft shadow textures using convolution," SIGGRAPH '98 (Jul. 1998).

* cited by examiner

*Primary Examiner*—Abolfazl Tabatabai
(74) *Attorney, Agent, or Firm*—Robert C Kowert; Meyertons, Hood, Kivlin, Kowert & Goetzel, P.C.

(57) ABSTRACT

Shadows from physical lights have a penumbra region, in which the light is only partially hidden from the shadow acceptor. The intensity of light in this region may be calculated using an approximation of the amount of light visible. For example a fragment or pixel shader program execution on a GPU may generate a shadow from a light source using the light intensities for each pixel being rendered. Per-pixel shadow density information may be projected from the shadow caster onto the shadow acceptor. A penumbra map may contain both depth information and light attenuation information for the shadow acceptor. This information may be blurred using a fragment or pixel shader on a GPU to determine an average shadow density for a pixel being rendered.

20 Claims, 9 Drawing Sheets project shadow density information to generate penumbra map including light attenuation and depth information for pixels on a shadow acceptor
200 calculate a radius for a convolution filter for a particular pixel on the shadow acceptor based, in part, on the depth information in the penumbra map
220 apply convolution filter to the shadow density values for a plurality of pixels within the convolution radius of the particular pixel to determine an average shadow density for the particular pixel
240 use the average shadow density for the particular pixel in one or more lighting calculations to render the particular pixel
260

FIG. 2

CALCULATING SHADOW FROM AREA LIGHT SOURCES USING A SPATIALLY VARYING BLUR RADIUS

BACKGROUND

1. Field of the Invention

The present invention is directed to computer systems. More particularly, it is directed to graphical image processing including the generation of shadows with penumbra.

2. Description of the Related Art

Light emanating from a point will not have a penumbra as the shadow acceptor will either receive no light or full light. Penumbrae from area light sources are done on the CPU by either stochastic ray casting or by other generally execution-expensive geometrical projections. Shadows from such point light sources have been calculated on the GPU from some time using various types of shadow maps that generally include only depth information, such as indicating a distance between a light source and a shadow caster. Such techniques may not well-suited for calculating light from area light sources.

SUMMARY

Shadows from physical lights have a penumbra region, in which the light is only partially hidden from the shadow acceptor. The intensity of this region due to area light sources, such as spherical light sources, may be calculated using an approximation of the amount of light visible. This calculation may be performed on a GPU using the projected intensities from a shadow-attenuation, or penumbra, map. For example a fragment or pixel shader program execution on a GPU may generate a shadow from a light source using the light intensities for each pixel being rendered.

Previous systems generate a shadow map containing only depth information (possibly on the GPU) and use it in a second pass to generate/determine what is in shadow and what is not during the lighting calculation (possibly on the GPU). This invention includes generating a special shadow map on the GPU, called the penumbra map, containing light attenuation information for the shadow acceptor. In a second pass on the GPU, for each pixel, P, in the shadow acceptor calculate the radius of a convolution filter using the data stored in the penumbra map. Then convolve the attenuation values and apply it to the incoming light intensity during the standard point light calculation.

A "penumbra" may, in some embodiments, represent a region of a shadow in which the light source is partially hidden. In other words, the transition area between the darkest area of a shadow and no shadow at all may be considered the penumbra of the shadow. Point light sources do not cast shadows with penumbra. An "umbra" may refer to a part or region of a shadow in which the light source is completely hidden. The term "shadow caster" may represent an object (or, in some embodiments, a plane or layer of an image) that casts a shadow and the term "shadow acceptor" may represent an object that is shadowed by one or more shadow casters. Thus, in some embodiments, a shadow may be cast on a shadow acceptor by a shadow caster. A "shadow map" may refer to a 2-dimensional array containing depth values obtained by rendering the scene from the light point of view.

The present invention, as will be described herein with reference to several embodiments, may include calculating shadows produced by an RGBA texture mapped planar polygon (with alpha information) from an area light source onto another planar texture mapped polygon, which includes the penumbra. The calculation of the shadow intensity may be performed on a graphics processing unit (GPU) without ray casting or stochastic methods.

Per-pixel shadow density information may be projected from the shadow caster onto the shadow acceptor. This information may then be blurred, such as with a box filter, using the distance to the center of the light, the distance to the shadow caster and the light radius to calculate the convolution radius. The projection of shadow density information may be based on simple trigonometric equations. The blur or other convolution may be performed using a fragment or pixel shader on a GPU, and may stored as in a penumbra map. During lighting calculations the information from the penumbra map may be used to decrease the amount of light from the source.

BRIEF DESCRIPTION OF THE DRAWINGS

FIG. 2 is a flowchart illustrating one embodiment of a method for generating shadow penumbra, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, shadows from genuine, physical lights have a penumbra region, in which the light is only partially hidden from the shadow acceptor. The intensity of this region may be calculated using an approximation of the amount of light source visible. While the techniques described herein may be used with area lights of any, arbitrary shape generally, for ease of discussion, the examples and exemplary embodiments described and illustrated include spherically shaped light sources. As will be described in more detail below, calculating the intensity of a penumbra region may be performed on a graphics processing unit (GPU), such as by using projected intensities from a shadow-attenuation, or shadow density, map. Thus, a shadow, as projected from a area light source, may be calculated on a GPU using fragment, or pixel, shader programs that calculate the light intensities for each pixel being rendered.

Figure 1A:
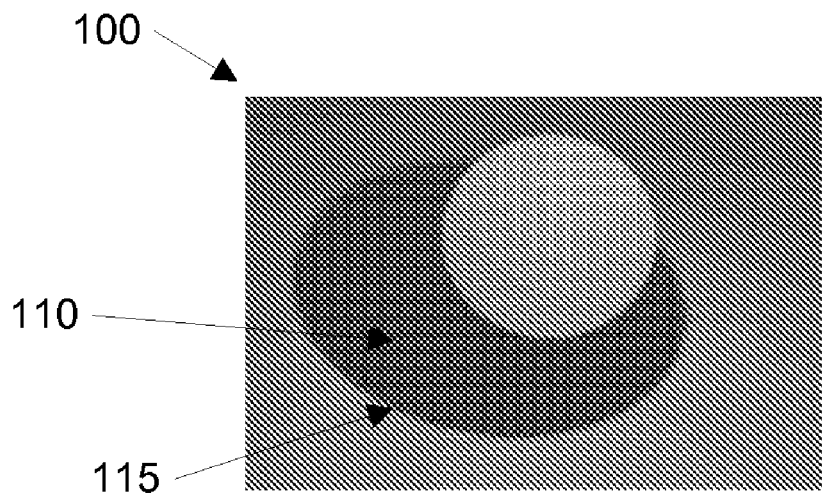
FIG. 1A illustrates an image including a shadow without penumbra, generated according to the prior art.
Figure 1B:
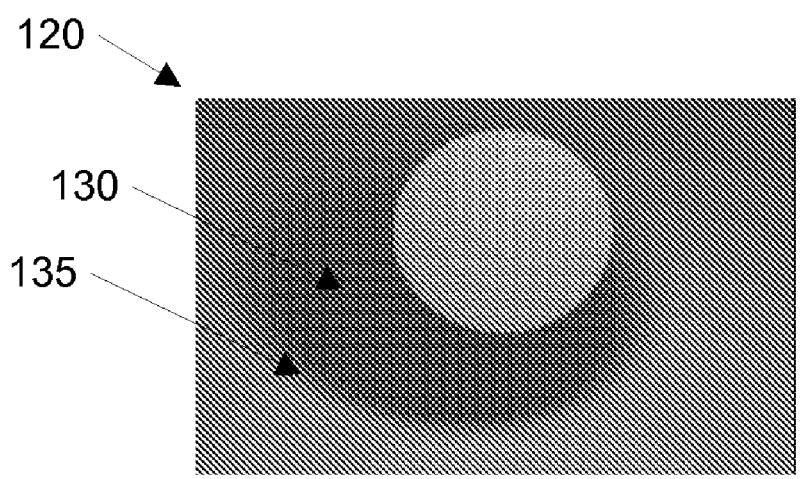
FIG. 1B illustrates one embodiment of an image including a shadow with penumbra, as may be generated as described herein.

FIG. 1A illustrates an image 100 that includes a shadow 110 generated according to the prior art. Shadow 110 does not have a penumbra. Instead, shadow 110 has a sharp edge 115 around its perimeter. FIG. 1B illustrates an image 120 generated, according to one embodiment, using a spatially varying blur radius, as described herein. Image 120 includes a shadow 130 that includes a penumbra in contrast to shadow 110 illustrated in FIG. 1A. Rather than having a sharp edge as illustrated with shadow 110, shadow 130 has a soft or fading edge 135. As described previously, a "penumbra" may, in some embodiments, represent a region of a shadow in which the light source is partially hidden. The transition area between the darkest area of a shadow and no shadow at all may be considered the penumbra of the shadow. An "umbra" may refer to a part or region of a shadow in which the light source is completely hidden. Point light sources, as opposed to area light sources, do not cast shadows with penumbra. Thus, shadows similar to that illustrated in FIG. 1A (e.g., shadows with hard or sharp edges) may be generated using a point light source and shadows with penumbra, such as shadow 130, may be generated using area light sources.

In general, three objects are required for a shadow to be cast: a light source, a shadow caster and a shadow acceptor. The term "shadow caster" may represent an object (or, in some embodiments, a plane or layer of an image) that casts a shadow and the term "shadow acceptor" may represent an object that is shadowed by one or more shadow casters. Thus, in some embodiments, a shadow may be cast on a shadow acceptor by a shadow caster. While the techniques described herein may be used with image information representing objects of generally any shape, the embodiments and examples described herein utilize image information representing planar image data. Thus, while in some embodiments, a shadow caster may represent a 3D object of varying shape, in other embodiments described herein, a shadow caster may represent a two-dimensional plane of graphics information. As described herein, shadows may be generated from planar images. The planar images may have transparency (or alpha) information associated with them. Such transparency information may allow a particular opaque region of the planar image to cast a shadow while other, transparent, regions of the planar image may not. Thus, only part of the planar image may cast a shadow. Shadows are of images within the planar image, not just a rectangular image of the planar image.

Shadows may be generated with the aid of a "shadow map." A "shadow map" may refer to a 2-dimensional array containing depth values (e.g., distances between a light source and an object casting a shadow) obtained by rendering the scene from the light point of view. When generating a shadow with penumbra, as described herein, a special shadow map, which may be referred to a penumbra map, may be generated. FIG. 2 is a flowchart illustrating one embodiment of a method for generating shadow with penumbra, as described herein. Thus, as indicated by block 200, shadow density information may be projected to generate a penumbra map that includes light attenuation and depth information for pixels on the shadow acceptor, according to one embodiment. In some embodiments, the penumbra map may include light attenuation, or shadow density, information for pixels the shadow acceptor. In other words, a measure of the amount of light attenuation caused by a shadow caster may be projected onto appropriate pixels of the shadow acceptor and stored in the penumbra map. For example, whether or not any particular pixel of the shadow acceptor is in shadow (cast by the shadow caster) may be stored in the penumbra map. Thus, in some embodiments, a penumbra map may store information regarding whether or not each pixel (in at least a portion) of the shadow acceptor is in shadow or not. In one embodiment, a penumbra map may store a binary value for each pixel indicating whether that pixel is in shadow or not.

The penumbra map may also include, as indicated by block 200, depth information for the pixels of the shadow acceptor. As noted above, a shadow map may include information regarding the distances between the light source and the shadow caster. In some embodiments, depth information may be included in the penumbra map. For example, a penumbra map may include, regarding each pixel of the shadow acceptor, the distance between the light source (e.g., the center of a spherical light source) and the shadow caster that light travels to reach the respective pixel. Thus, in some embodiments, the penumbra map may be used to determine the shadow density or amount of light attenuation that affects the amount of light reaching pixels on the shadow acceptor.

In one embodiment, the distance from the (center of) the light source to the closest object in the scene between the light source and the shadow acceptor is stored in the penumbra map. In general, a point on the shadow caster whose distance from the light source is stored in the penumbra map cannot be in shadow since it is the closest thing to the light along the light path to the shadow acceptor. Consequently, a point on the shadow acceptor that is also on the same line along the direction of the light is in shadow since there is an object (or opaque region) of the shadow caster that is between the shadow acceptor and the light.

Thus, for a particular pixel of the shadow acceptor surface, a corresponding entry in the penumbra map may indicate whether that particular pixel is in shadow or not. For example, as noted above, if the distance in the corresponding entry indicates a distance less than the distance from the light source to that particular pixel on the shadow acceptor, then the pixel is in shadow. A distance less that from the pixel to the light indicates that a shadow caster is in between the light and pixel along the path of the light.

In some embodiments, the distances in the penumbra map may be converted to a binary 0 or 1, such as to indicate directly whether the corresponding pixel on the shadow acceptor is in shadow. After generating the penumbra map, a radius (e.g., blur radius) for a convolution filter may be calculated for each pixel using the light attenuation and depth information stored in the penumbra map, as illustrated by block 220. For example, as will be described in more detail below, the attenuation values for pixels within the calculated radius of each particular pixel may be convolved (e.g., using a convolution filter) and applied to the incoming light intensity during standard point (or other) light calculations, according to some embodiments.

As noted above, the penumbra map may store distances between the light source and the shadow caster, if any, between the light source and the pixels of the shadow acceptor. In some embodiments, the distances stored in the penumbra map may be converted to binary values indicating whether the corresponding pixel is in shadow or not. Merely averaging the distances will not render suitable shadows. When determining the shadow density for a particular pixel on the shadow acceptor, each pixel in the blur radius may be compared to its neighboring pixels (within the convolution radius) to determine whether the particular is in shadow, such as by comparing the distances stored in the penumbra map for adjacent pixels and converting to a binary 0 or 1 indicating shadow or not, and then averaging the binary values within the blur radius to obtain a non-binary value between 0 and 1 that represents the shadow density of the pixel to be rendered. According to the above example, a point completely in shadow (in the umbra) may have a 1 representing its shadow density because all of its neighboring points are also in shadow (and therefore also have binary 1 representing their shadow density). Whereas a point somewhere within the penumbra may have a shadow density of less than 1 because some of its neighboring pixels (within the convolution radius) would have 1's and some would have 0's representing their respective shadow densities. The averaging (or other convolution) of the values in the convolution radius would therefore result in a shadow density somewhere between 0 and 1.

In general, the size of the convolution radius may represent the size of the shadow penumbra. In some embodiments, a convolution radius may be calculated separately for each pixel of the shadow acceptor being rendered. Thus, the convolution radius may change from one pixel to the next. When determining or calculating the convolution radius, the size of the penumbra, and therefore the convolution radius, may be directly proportional to the radius of the light source and to the distance from the light source to the shadow castor. Conversely, the size of a convolution radius, or of the penumbra, may be indirectly proportional to the distance from the shadow acceptor to the shadow caster.

In some embodiments, rather than generate shadow penumbra using an elliptical convolution region, the convolution filter may be applied to a rectangle approximating the convolution region. For example, a square with a side length equal to the convolution radius may be used in some embodiments. In other embodiments, rectangles of other shapes and sizes may be used to approximate an elliptical convolution region.

Thus, for each pixel of the shadow acceptor being rendered, the light (and therefore color value) for the pixel is determined, at least in part, based on applying a convolution filter, such as a box blur in some embodiments, to the light attenuation values, as stored in a penumbra map, for all pixels within the convolution radius of the particular pixel to determine an average shadow density for the particular pixel, as indicated by block 240.

By applying a convolution filter to the shadow density information stored in the penumbra map for a radius of pixel around a particular pixel being rendered the shadow may be "softened" or blurred to create a penumbra. For example, in one embodiment, the shadow density information for a radius of pixels may be averaged to determine, at least in part, the final, or average, shadow density or light attenuation value for the particular pixel being rendered and that average shadow density may be used in any of various lighting calculation when rending the particular pixel, as indicated by block 260. Thus, while a pixel near the edge of the shadow region, which therefore may have many pixels near it that are not in shadow, may be rendered lighter or as to appear in less dense shade or shadow due to the averaging of the pixels within the convolution radius around it, according to one embodiment.

While simply using a fixed size convolution radius may result in shadows with penumbra regions, the shadows and penumbra regions may not be correctly or appropriately shaped. If the size of the convolution radius is determined based on the relative sizes, geometry and distances between the light source(s) shadow caster(s) and shadow acceptor, however, a shadow of more appropriate or correct shape may be generated, according to some embodiments. For example, calculating a convolution radius, as described above regarding block 220 of FIG. 2, may involve analysis and/or calculations based on the relative sizes and the distances between the light source, the shadow caster and the shadow acceptor may be used to calculate or otherwise determine the convolution radius. Thus, by using a spatially varying convolution radius, shadows with penumbra may be generated on a GPU, as described herein.

Additionally, the techniques described herein may also includes, according to various embodiments, calculating anti-aliased shadows, such as may be produced by an RGBA texture mapped planar polygon (with alpha information) from an area light source onto another planar texture mapped polygon, which includes the penumbra. Furthermore, the calculation of the shadow intensity, as described herein, may be performed on a graphics processing unit (GPU) without performing expensive ray tracing (or ray casting) or stochastic methods.

According to one embodiment, the per-pixel shadow density information is projected from the shadow caster to a rectangle coincident with the shadow acceptor. That information may then be blurred, such as with a box filter, using the distance to the center of the light source, the distance to the shadow caster and the size of the light source (e.g., the light radius) to calculate the convolution, or blur, radius. In some embodiments, the blur radius may be calculated using simple trigonometry. Additionally, the convolution, or blur, filter may be performed using a fragment shader on the GPU in some embodiments. The resulting shadow values for pixels of the shadow acceptor may be stored as an attenuation texture. Thus, during subsequent lighting calculations the attenuation texture may be used to determine the amount of light reaching a particular pixel being rendered.

When rendering a shadow produced by a planar polygon onto another planar polygon from an area light source shadow density information may be projected from the shadow caster onto the shadow acceptor. Additionally, the shadow density information may be used to compute the radius of a convolution filter to average, or otherwise "soften", the shadow information and/or attenuate the light intensity. For example, a box blur may be used to average the shadow density information within the convolution radius of a pixel. Thus, in some embodiments, a shadow generator may be configured to project opacity information from the shadow caster to the shadow acceptor and then blur those values using a box filter with a radius determined using simple geometry. Since the convolution radius is calculated for each pixel based on the sizes and distances of the light source(s) and shadow caster(s) from the shadow acceptor, the convolution radius of the filter may vary from point to point (and pixel to pixel) on the shadow acceptor, thus producing smooth shadows with penumbrae, according to some embodiments.

Figure 3:
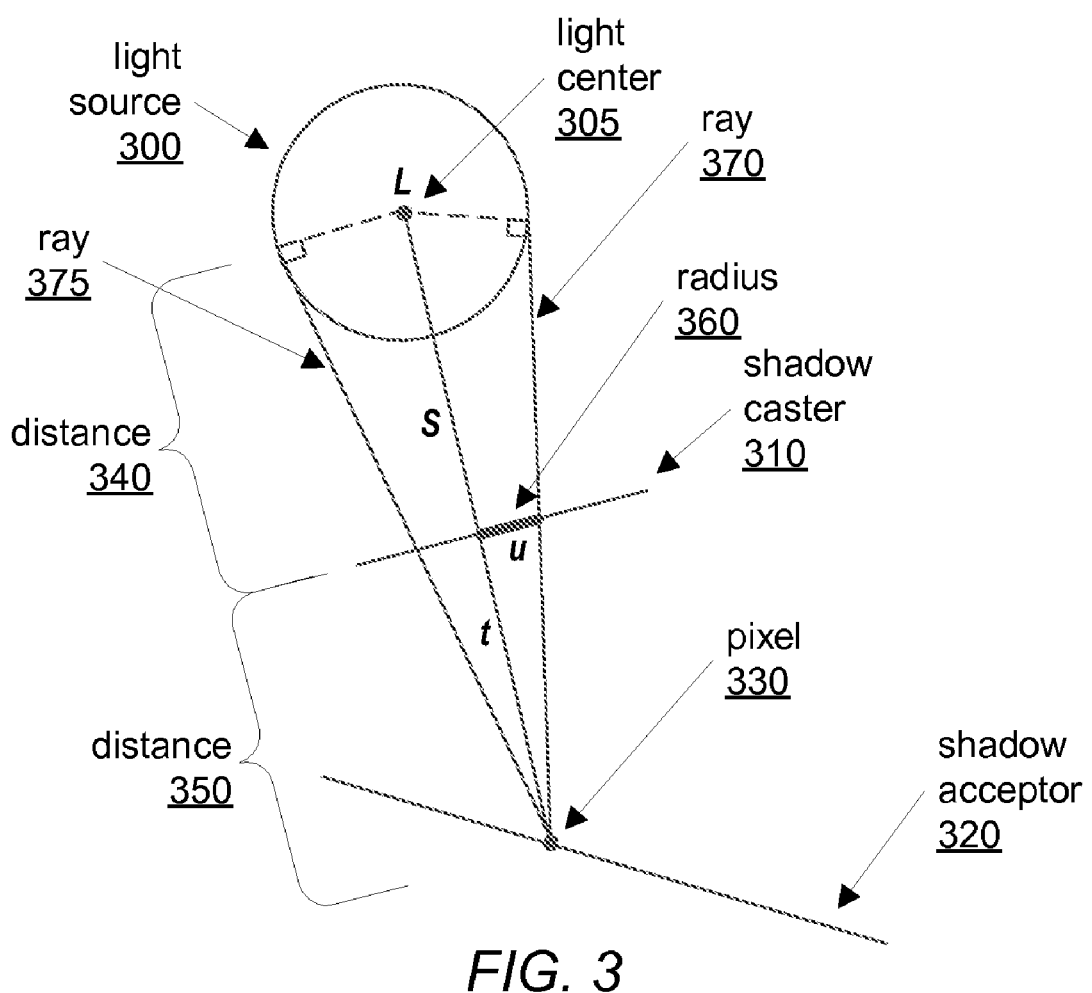
FIG. 3 is a block diagram illustrating one embodiment of a logical arrangement of a light source, a shadow caster and a shadow acceptor.

The following pseudo-code illustrates one embodiment of using a convolution filter to blur shadow information to create a shadow penumbra:

Calculate blur radius;

accumulated_density=0;

accumulated count=0;

For each entry within the a distance of blur radius
   {
   if (distance in the penumbra map< distance to shadow acceptor)
{
    accumulated_density+=penumbra_map_density;
    accumulated_count++;
}
}
shadow_density=clamp(accumulated_density/
    accumulated_count, 0.0, 1.0);
Light reaching shadow acceptor=(1.0−shadow_density)*
    light_source_intensity;

FIG. 3 is a block diagram illustrating one embodiment of an area light source 300 and a shadow of a shadow caster 310 casting a shadow on a shadow acceptor 320. The light source 300, with its center 305 labeled L, may be spherical in some embodiments, even though illustrated as a circle in FIG. 3, with a radius r. The center 305 of light source 300 may be considered a distance 340, indicated by line segment s, from a point on the shadow caster. Likewise, shadow caster 310 may be considered a distance 350, indicated by line segment t, from shadow acceptor 320. Shadow caster 310 may have light attenuation information, also referred to as shadow density information, for each point or pixel, generally called alpha, or α, information. The total amount of light from light source 300 reaching pixel 330 on shadow acceptor 320 comes from the portion of the sphere of light source 300 subtended by rays 370 and 375 from pixel 330 that are tangent to the sphere, as illustrated in FIG. 3.

Figure 4:
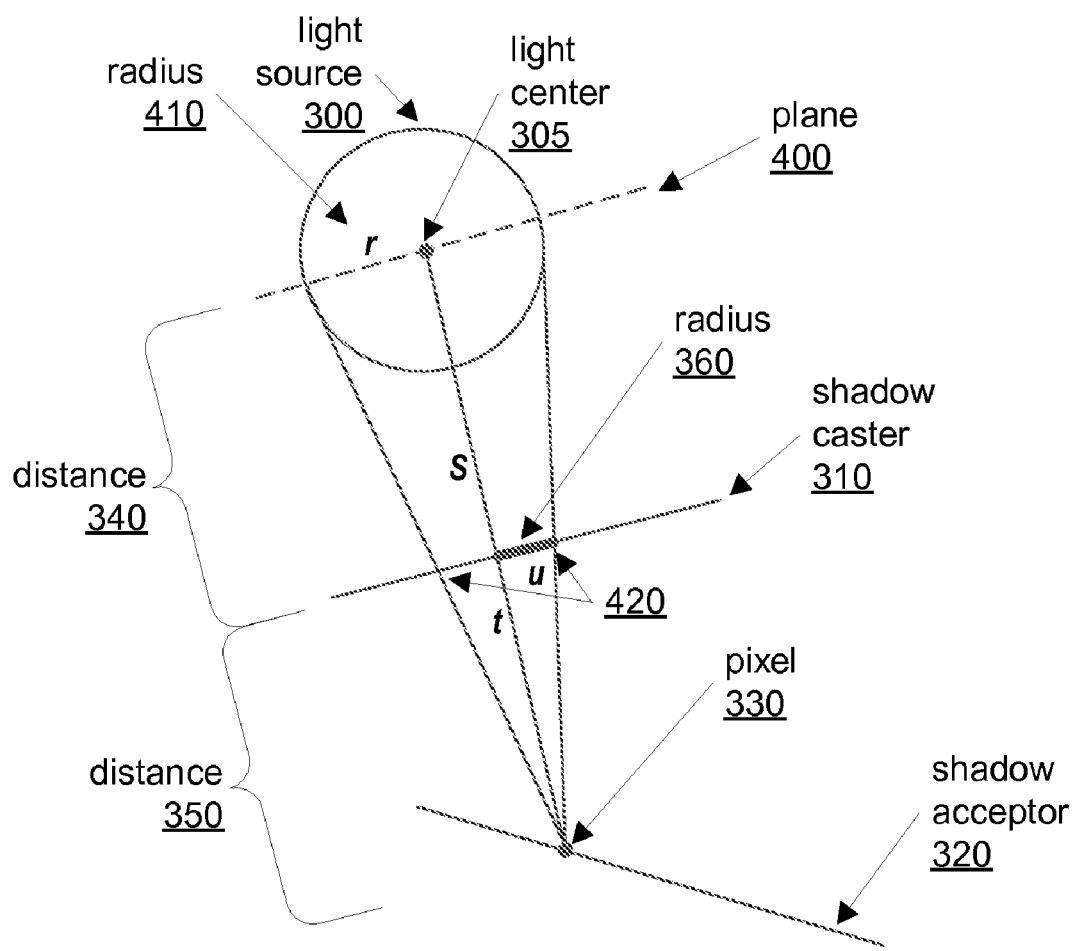
FIG. 4 is a block diagram illustrating a plane constructed through the center of a area light source and parallel to a shadow caster plane, according to one embodiment.

When calculating shadow penumbrae, as described herein, a plane may be constructed through the center of a spherical light source, parallel to the shadow caster plane, according to some embodiments. FIG. 4 is a block diagram illustrating a plane constructed through the center of a spherical light source and parallel to a shadow caster plane, according to one embodiment. Thus, a plane 400 may be constructed through the center 305 of light source 300 and parallel to shadow caster 310. A cone projected from pixel 330 to the edges of the light source, such as along rays 370 and 375, may intersect with the plane of shadow caster 310 and thus define an elliptical region 420 of shadow caster 310. In some embodiments, elliptical region 420 may be approximated by a disc or circle. By approximating elliptical region 420 as a circle, simpler mathematical calculations may be performed, thereby potentially improving overall performance when generating shadows with penumbra, according to some embodiments.

The radius of the circle used to approximate elliptical region 420 may be determined from the radius 410 of the spherical light source 300 and the distances 340 and 350, between light source center 305 and shadow caster 310 and between shadow 310 caster and shadow acceptor 320 (at pixel 330), respectively. For example, using the similar triangles formula, the following equation yields the radius 360 (represented by u in the equation):

$u = r*t/(s+t)$

Thus, in some embodiments, the radius of a circle approximating an elliptical region defined by the intersection of a cone projected from pixel 330 (to points on the light source) with shadow caster 310 may be determined by dividing the product of the distance 350 between shadow caster 310 and shadow acceptor 320 by the distance between the center 305 of light source 300 and shadow acceptor 320 (i.e., the sum distances 340 and 350).

The total intensity of light reaching a pixel 330 on shadow acceptor 320 may, in some embodiments, be approximated by multiplying the intensity of a ray from the center 305 of light source 300 to pixel 330 by the average attenuation, such as based on the shadow density (or alpha) information regarding shadow caster 310. The total intensity of light reaching pixel 330 may then be used in any of various lighting calculations, such as the standard Phong shading calculations, where it may be assumed that the light source is a local point light source. However, using the total intensity of light reaching pixel 330 in standard shading lighting calculations, such as Phong, may cause shadows to have a blocky look, possibly due to the fact that the average attenuation may remain constant over a region surrounding pixel 330.

However, according to some embodiments, shadows that may not have a blocky look may be generated by first projecting shadow density or alpha values from shadow caster 310 onto shadow acceptor 320 and subsequently averaging those (shadow density) values over a projected region based on a spatially varying convolution radius, as described herein.

Figure 5:
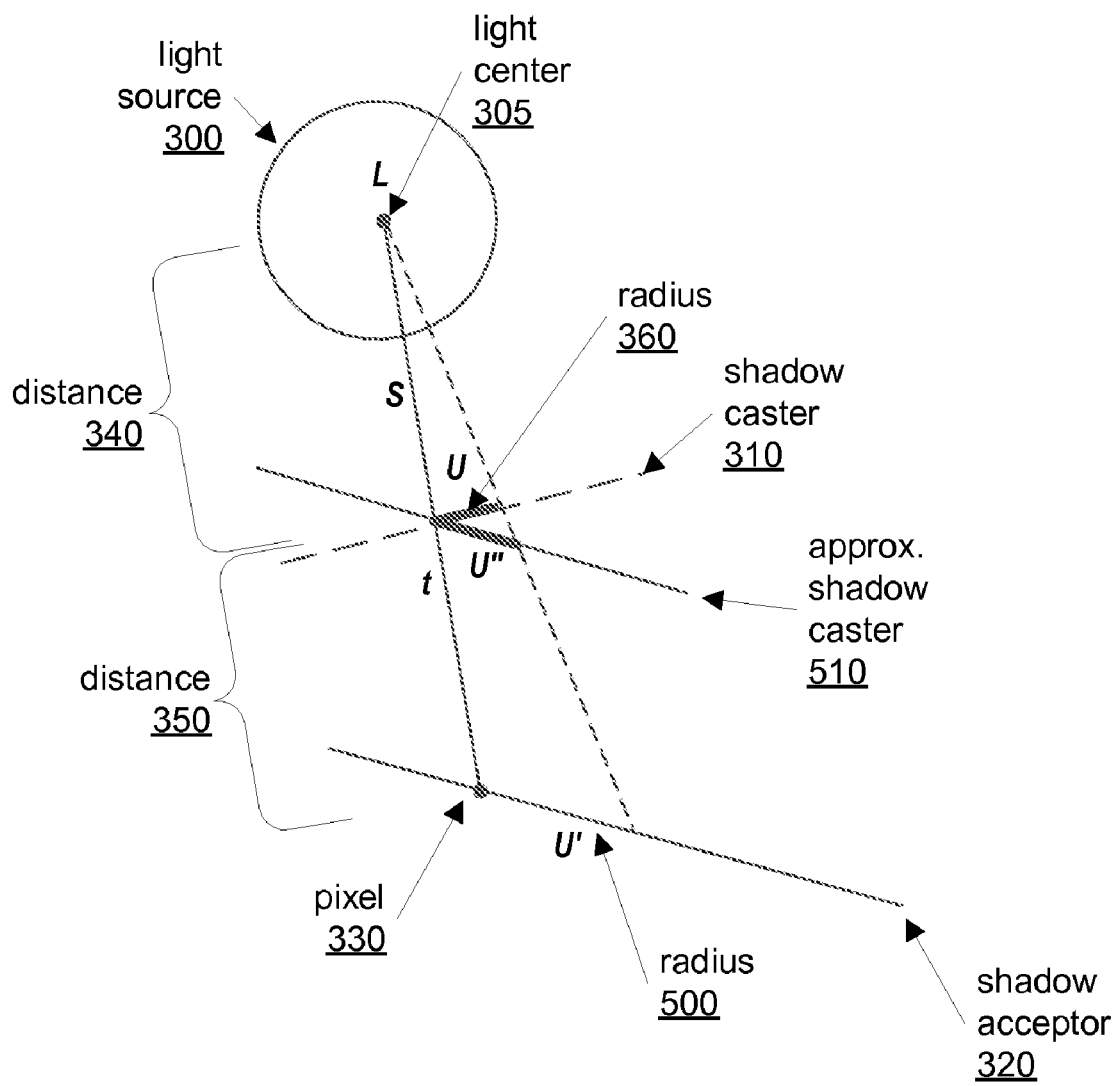
FIG. 5 is a block diagram illustrating one embodiment of generating penumbral shadows, as described herein.

FIG. 5 is a block diagram illustrating one embodiment of generating penumbral shadows, as described herein. As noted above, the shadow density (e.g., alpha) values regarding shadow caster 310 may first be projected onto shadow acceptor 320. Subsequently, during light calculations, these shadow density values may be averaged over a projected region, U', and light reaching a pixel may be attenuated accordingly. For example, light reaching pixel 330 may be attenuated according to an averaging or other convolution, of the shadow density values for a region of shadow acceptor 320. the region, U', used to determine the average shadow density value for pixel 330 may, in some embodiments, be defined by the intersection of a cone projected from the center 305 of light source 300, through shadow caster 310 to shadow acceptor 320, as illustrated by FIG. 5.

Thus, region U', used to determine the average shadow density value for pixel 330, may be defined as an elliptical region. However, in some embodiments, elliptical region U' may be approximated by a circle of radius 500. In order to determine the size of radius 500 of the circle approximating elliptical region U', ray-polygon intersection calculations may be used in some embodiments. In other embodiments, however, it may be assumed that the plane of shadow caster 310 is parallel to the plane of shadow acceptor 320, as illustrated in FIG. 5 by approximated shadow caster 510.

Using the similar triangles formula, the size of radius 500 may be determined by the following equation:

$u' = u*(s+t)/s$

Furthermore, as noted previously:

$u = r*t/(s+t)$ which yields:

$$u' = u*(s+t)/s$$
$$= r*t*(s+t)/[s*(s+t)]$$
$$= r*t/s$$

Thus, u' may, in some embodiments, be considered the width of a convolution kernel, or blur radius, that used to average projected shadow densities to generate penumbral shadows, as described herein.

While described herein mainly in reference to shadows cast by a single light source, in some embodiments, shadows cast by multiple light sources may be generated including penumbra. When generate shadow penumbra cast from multiple light sources, a separate penumbra map may be generated for each light source. Thus, each penumbra map may include shadow density and distance information regarding the light projecting from a single light source. When rending a particular pixel, a new value or light value for the pixel may be calculated regarding each, individual, light source separately including the use of the corresponding penumbra map and application of a spatially varying convolution filter. The individual values for each light source may then be combined, such as via standard multiple-light source lighting equations, to determine the final image value for the particular pixel. Thus, the technique described herein regarding generating shadow penumbra may be applied generally to image scenes including virtually any number of light sources.

Similarly, while described herein regarding spherical light sources, shadow penumbra may, in some embodiment, be generated for non-spherical light sources by approximating the size and shape of the non-spherical light source with multiple, smaller, spherical light sources and then proceeding as described above regarding multiple light sources.

Shadows including penumbra, as described herein, may be generated or rendered on graphics hardware, such as on a GPU. As will be described herein, use of a penumbra map including both depth and shadow density information may allow shader programs on the GPU to calculate average (other otherwise convolved) shadow density information for pixels on a shadow acceptor.

A graphics processing unit or GPU is a dedicated graphics rendering device for a personal computer, workstation or game console. Modern GPUs may be very efficient at manipulating and displaying computer graphics and their highly parallel structure may make them more effective than typical CPUs for a range of complex graphical algorithms. For example, a GPU may implement a number of graphics primitive operations in a way that makes executing them must faster than drawing directly to the screen with the host CPU. Many GPUs have programmable shading as part of their capabilities. For example, each pixel can be processed by a short program that could include additional image textures as inputs, and each geometric vertex could likewise be processed by a short program before it was projected onto the screen. These pixel and vertex programs may be called 'shaders' and may implement looping and lengthy floating-point math, and in general are quickly becoming as flexible as CPUs and orders of magnitude faster for image-array operations. GPUs may include support for programmable shaders that can manipulate and vertices, pixels and textures with many of the same operations supported by CPUs, oversampling and interpolation techniques to reduce aliasing, and very high-precision color spaces.

GPUs may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers are most commonly interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU is extremely memory intensive, an integrated solution finds itself competing for the already slow system RAM with the CPU as it has no dedicated video memory. For instance, system RAM may experience a bandwidth between 2 GB/s and 8 GB/s, while most dedicated GPUs enjoy from 15 GB/s to 30 GB/s of bandwidth. Hybrid solutions also share memory with the system memory, but have a smaller amount of memory on-board than discrete or dedicated graphics cards to make up for the high latency of system RAM.

Figure 6:
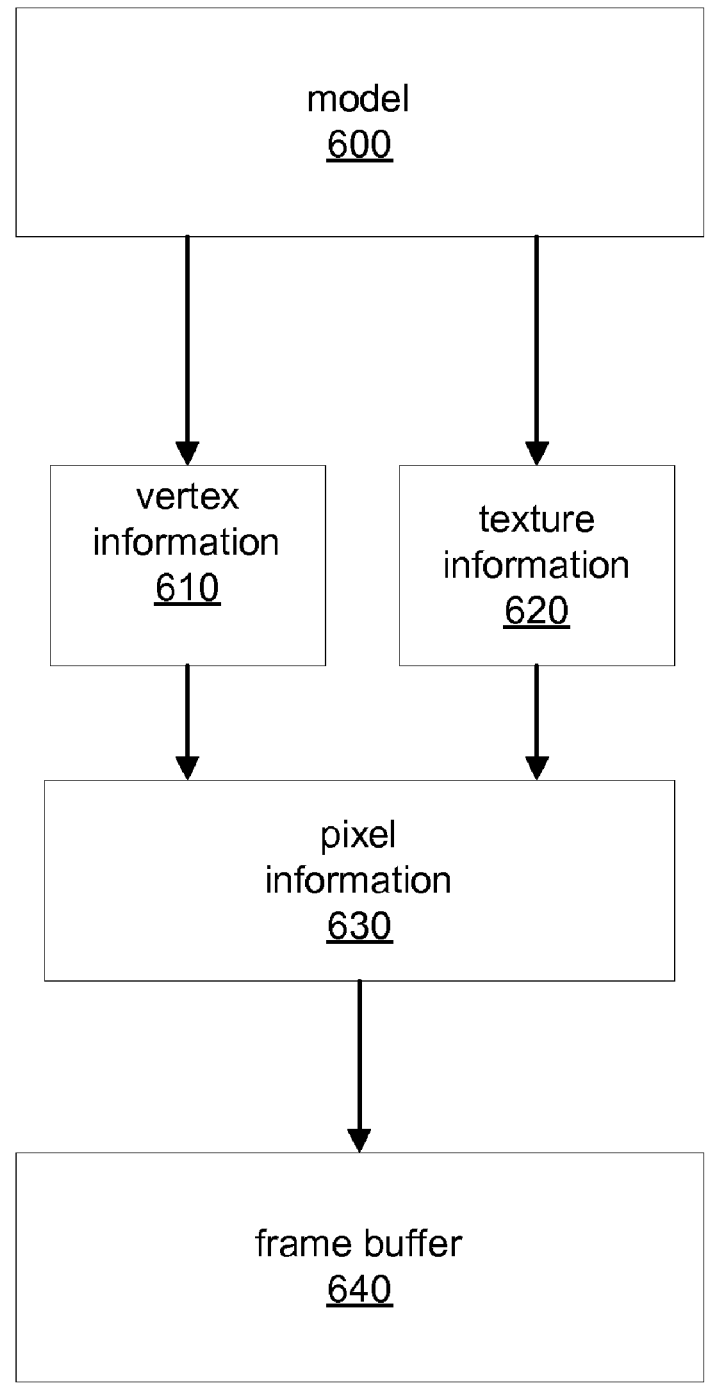
FIG. 6 is a block diagram illustrating one embodiment of the logic flow of rendering an image via a GPU.

A GPU may include programmable vertex and pixel and texture units. For example, FIG. 6 is a block diagram illustrating the logic flow of rendering an image via a GPU. As shown in FIG. 6, the model 600 of the graphics objects to be rendered is supplied from a graphics application executing on the CPU of a system and passes data to the vertex unit 610 and the texture unit 620. For example, graphics application 100, may call various functions of a graphics API, such as OpenGL or DirectX, that in turn instruct the various elements of the GPU to render the images. Vertex unit 610 may describe the geometry of an object while texture unit 620 may specify the skin covering on an object and pixel unit 630 may deal with the view of an object. As noted above, vertex unit 610 and pixel unit 630 may be configured to execute specific vertex and pixel programs, called shaders. For instance, vertex unit 610 may accept vertex information such as position from the model through a vertex buffer. As the same time, texture unit 620 may receive surface information from the model. Both units may complete processing and generate output pixel unit 630. Pixel unit 630 may then complete the lighting and view processing and output the rendered image to frame buffer 640 for display. A frame buffer may be a video output device that drives a video display from a memory buffer containing a complete frame of data. The information in the buffer typically consists of color values for every pixel (point that can be displayed) on the screen.

Figure 7:
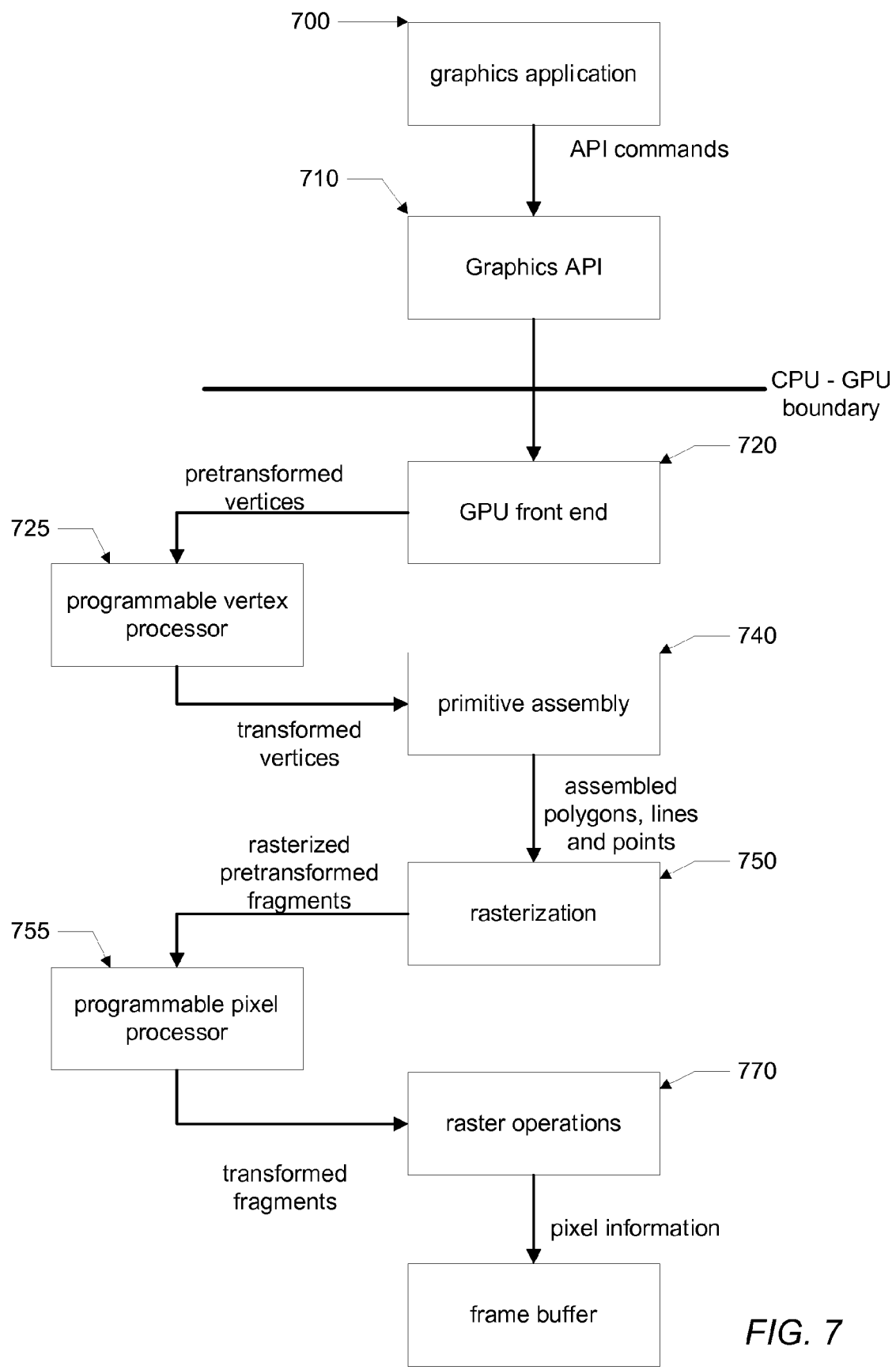
FIG. 7 is a block diagram illustrating one embodiment of the logical view of such a GPU pipeline.

Three-D graphics rendering involves numerous steps that are performed one after another. These steps can be thought of like an assembly line or pipeline. FIG. 7 is a block diagram illustrating one embodiment of the logical view of such a pipeline. A pipeline is a term used to describe the graphics card's architecture and it provides a generally accurate idea of the computing power of a graphics processor. There may be different pipelines within a graphics processor as there may be separate functions being performed at any given time. The pipeline may be broken down into two main stages: the geometry processing stage and the rendering stage. Geometry processing may involve calculations that modify or, in some cases, create new data for vertices. In the rendering stage of the pipeline, a pixel shader may be used to replace previously fixed function texturing, filtering and blending. A programmable shader, such as a pixel or vertex shader, may be considered a piece of code configured to perform different kinds of operations on GPU, including T&L, texturing, etc.

An important advantage of the modern GPU is the ability to be programmed through languages like OpenGL, DirectX or C for Graphics (CG). DirectX and OpenGL are graphics APIs or Application Programming Interfaces. Before 3D graphics APIs, each graphics card company had its own proprietary method of making their graphics card work. Developers were forced to program with vendor-specific paths for each and every type of graphics card they wished to support. This was naturally a very costly and inefficient approach. To solve this problem, 3D graphics APIs were created, so that developers could program their software to be compliant with the API and not with each independent piece of hardware. The responsibility of compatibility was then shifted to the graphics card manufacturers who had to ensure that their drivers where compatible with the API.

There emerged two different APIs, DirectX and OpenGL, both of which are used today. Initially, the APIs were relatively simple. Developers had to mix-and-match visual effects from an unchanging list of pre-programmed effects. Custom shader programming allows developers to create truly custom visual effects for the first time. Thus, graphics application 300 may call various functions supplied by graphics API 310, such as DirectX or OpenGL, in order to utilize the GPU to render a graphic image.

As noted above, vertex processor 725 and pixel processor 755 may be user programmable. A program executed by vertex processor 725 and/or pixel processor 755 may be called a 'shader'. Vertex shaders may deform or transform 3D elements.

A pixel processor, such as pixel processor 755, may be a component on the graphics chip devoted exclusively to pixel shader programs. These processing units may only perform calculations regarding pixels. Because pixels represent color values, pixel shaders may be used for all sorts of graphical effects. Pixel shaders may change pixel colors based on various types of input. For example, when the object is lit by a light source in a 3D scene in which some colors appear brighter while other colors create shadows, both the brighten objects and the shadows may be generated by changing various pixels' color information in a pixel shader. As noted above, a GPU may also include vertex processors, such as vertex processor 725, configured to execute vertex shaders that affect vertices.

A vertex shader may receive streams of vertex data from the graphics pipeline perform operations on the data and output the transformed vertex data to the graphics pipeline for further processing. For example, vertex processor 725 may receive pretransformed vertex data from GPU front end 720 and output transformed vertices to primitive assembly unit 740. Subsequently, the assembled polygons, lines and points may be sent to a rasterization unit 750. Pixel processor 755 may receive rasterized pretransformed pixel information, also called fragments, execute the applicable pixel shaders and output transformed fragments (pixel information) to a raster operations unit 370 that may then output the final pixel information to frame buffer Raster operation processors (ROPs), such as raster operations unit 770, may be responsible for writing pixel data to memory.

A GPU may also include texture mapping units (TMUs). Textures need to be addressed and filtered. This job is frequently performed by TMUs that work in conjunction with pixel and vertex shader units. The TMU's job is to apply texture operations to pixels. Data communicated between the graphics processing unit and the rest of the computer may travel through the graphics card slot or other interface.

A technique called texture mapping may be used to map a digital image onto a surface of a graphic object. The image data mapped onto the object may be called a texture, and its individual elements may be called texels. The rectangular texture resides in its own texture coordinate space, or the texture may be defined by a procedure. At each rendered pixel, selected texels may be used to substitute for or to scale one or more surface properties, such as diffuse color components. One pixel may often mapped by a number of texels. For example, when a texture is mapped to a polygon, it is common to assign texture map coordinates directly onto the polygon's vertices. A number of different textures may be stored in a single texture atlas.

In the same manner that color can be assigned to a pixel, transparency or opacity can be assigned to it as well. Opacity and transparency are complements of each other in the sense that high opacity implies low transparency. The opacity may be considered a normalized quantity in the range [0,1], or alternatively in a discrete form in the range [0, 255] for use with 8 bit hardware. Opacity a may be related to transparency t by the expression: a=1−t. If an object has high opacity (a=1), the objects and light behind it are shielded and not visible. If at the same time the object has a non-zero color value, it is "emitting" light so it is visible. On the other hand, if a<1, the object is transparent and objects behind it are visible through it. If a=0, the object is invisible whatever the colors are.

As noted above, shadows including penumbra, as described herein, may be generated or rendered on graphics hardware, such as on a GPU. As will be described herein, use of a penumbra map including both depth and shadow density information may allow shader programs on the GPU to calculate average (other otherwise convolved) shadow density information for pixels on a shadow acceptor. For example, by projecting shadow density values onto a shadow caster and by maintaining the radius and distance values in a 3-component texture as a penumbra map, penumbral shadows may be generated using a fragment shader program on a GPU. Subsequently, during lighting calculations to render a pixel, the size of the convolution region may be determined using the values from the penumbra map.

Given a texture including a shadow caster's shadow density (represented as either alpha values or may include all color components, in some embodiments, the shadow density information may be projected onto the shadow acceptor. For instance, the center of the projection may be the center point of a spherical light source. The light radius may be supplied to the GPU shader program as a uniform variable (along with other information). Additionally, the texture comprising the penumbra map may be configured to have the same coordinates as the shadow acceptor in some embodiments. When rendering the shadow acceptor, densities may be summed and the result averages. Standard point light equations may be used to calculate the light value at each pixel of the shadow acceptor using the average shadow density may be used to attenuate the light reaching each particular pixel.

Figure 8:
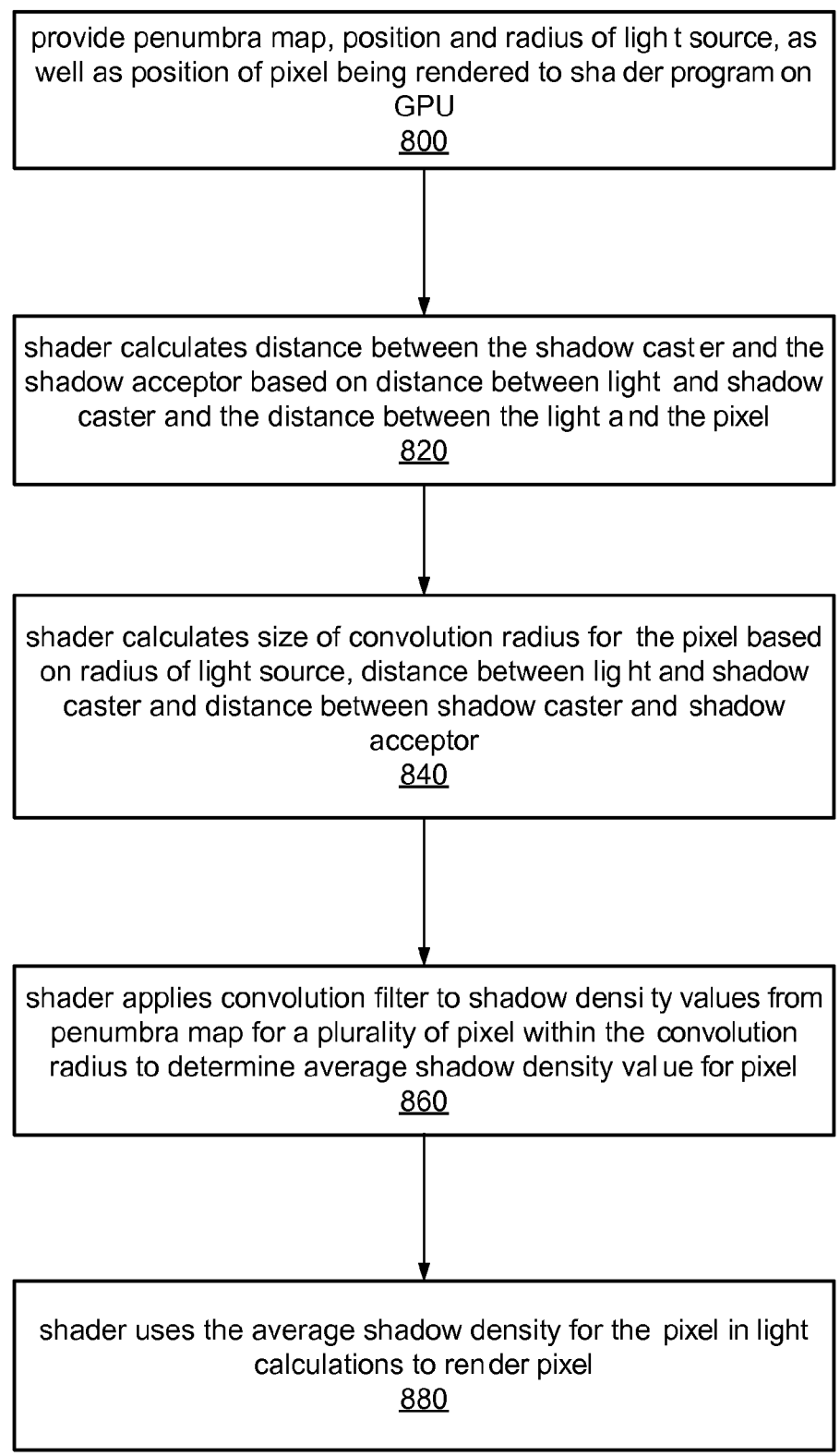
FIG. 8 is flowchart illustrating one embodiment of a method for generating shadow penumbra on a graphics processing unit (GPU).
Figure 9:
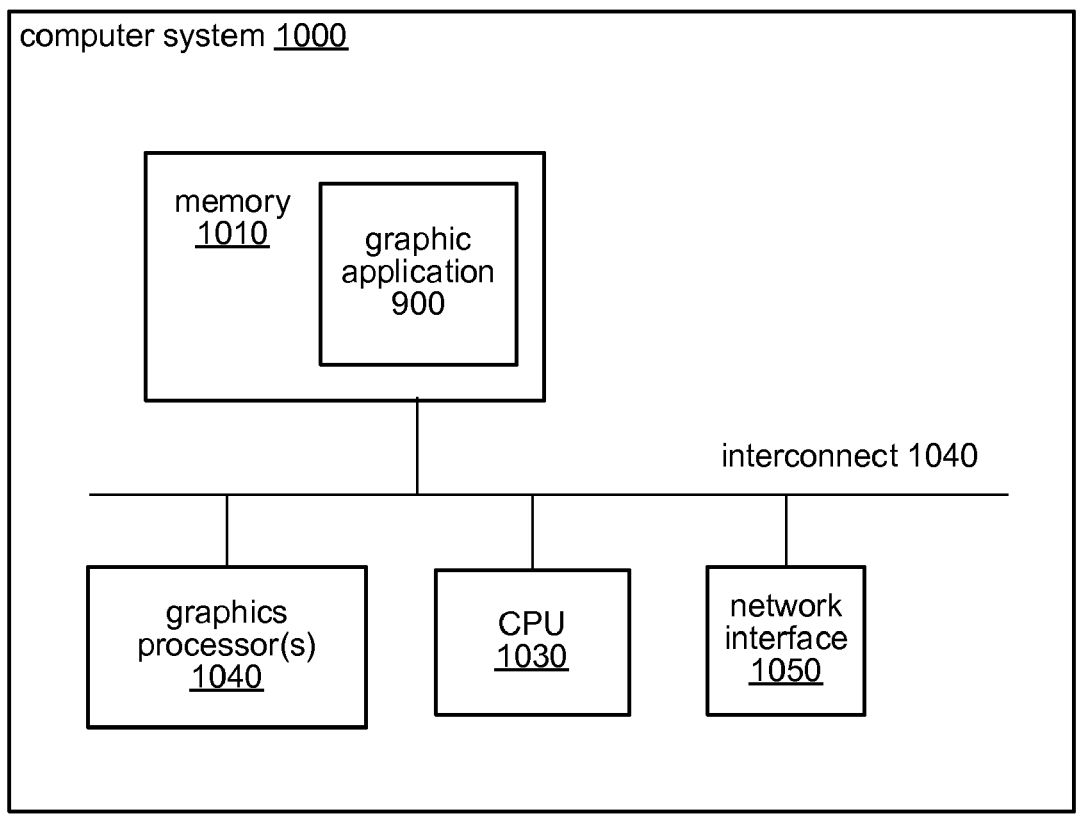
FIG. 9 is block diagram illustrating one embodiment of a computer system capable of generating shadows with penumbra on a GPU using a spatially varying convolution radius, as described herein.

FIG. 8 is flowchart illustrating one embodiment of a method for generating shadow penumbra on a graphics processing unit (GPU). When implementing the generation of shadow penumbra on the GPU, a graphics program may first provide the penumbra map, the radius and position of the light source, as well as the position of pixel being rendered as variables to a pixel (fragment) shader on the GPU, as indicated by block 800. The shader program may then calculate the distance between shadow caster and shadow acceptor based on distance between light and caster as well as distance between light and pixel on shadow acceptor, as indicated by block 820. For example, the shader program may first calculate the distance between the (center of) the light source and the pixel being rendered and then subtract the distance between the light and the shadow caster (from penumbra map).

The shader program may then calculate the size of convolution (or blur) radius for the pixel based on radius of light source, distance between light and caster and distance between shadow caster and shadow acceptor, as illustrated by block 840. As noted above, one or more assumptions and/or approximation may be used when calculating the size of the convolution radius. For example, in some embodiments, an approximate shadow caster plane parallel to the actual shadow caster may be used. In other embodiments, a circle or a rectangle of suitable size may be used to approximate an elliptical convolution region.

The shader program may then apply a convolution filter, such as a box filter or Gaussian blur, to shadow density values from the penumbra map for a plurality of pixels within convolution radius to determine an average shadow density value for the pixel being rendered, as in block 860. While the term "average shadow density" is used herein, the final value determined based on applying the convolution filter may not be an average in some embodiments. For example, in some embodiments, convolution filters involving computations other than strict averaging may be applied to the pixels within the convolution radius.

The shader program may then use the average shadow density in lighting calculations to render pixel, as indicated by block 880. In some embodiments, the shader program may supply the average shadow density for the pixel to another program, such as another shader program, that performs the rendering of the pixel and that may perform any of various lighting functions.

In some embodiments, multiple instances of the same shader program may be executed in parallel on the GPU and each instance may render, or at least calculate the average shadow density, of a single pixel the GPU.

The generation of shadow penumbra, as described herein, may be implemented on various types of computer systems. Referring to FIG. 6, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

A graphics application configured to generate shadow penumbra as described herein, such as graphics application 900, may represent various types of graphics applications, such as painting, publishing, photography, games, animation, and other applications. Additionally, such a graphics application may utilize a graphics processor when rendering or displaying images that include shadow penumbra, according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them must faster than drawing directly to the screen with a host central processing unit (CPU), such as CPU 1030. Please note that functionality and/or features described herein as being part of, or performed by, graphics application 120 may, in some embodiments, be part of, or performed by, one or more graphics processors, such as graphics processor 1040.

A graphics application capable of generating shadow penumbra, as described herein, may be provided as a computer program product, or software, that may include a computer-readable storage medium having stored thereon instructions, which may be used to program a computer system (or other electronic devices) to generate shadow penumbra, as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 120.

In some embodiments, memory 1010 may include program instructions configured to generate shadow penumbra, as described herein. A graphics application capable of generating shadow penumbra as described herein may be implemented in any of various programming languages or methods. For example, in one embodiment, graphics application 120 may be JAVA based, while in another embodiments, it may be implemented using the C or C++ programming languages. In other embodiments, such a graphics application may be implemented using specific graphic languages specifically for developing programs executed by specialize graphics hardware, such as GPU 1040. In addition, such a graphics application may be embodied on memory specifically allocated for use by graphics processor(s) 1040, such as memory on a graphics board including graphics processor(s) 1040. Thus, memory 1010 may represent dedicated graphics memory as well as general-purpose system RAM.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 2, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 2.

While graphics application 100 has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
generating a penumbra map including shadow information regarding a plurality of pixels of a shadow acceptor, wherein the shadow information includes for each of the plurality of pixels, a distance from a light source to a point on a shadow caster along a line traveled by light from the light source to the respective pixel, wherein the respective distance for each of the plurality of pixels indicates whether the pixel is in a shadow formed by attenuation of light from an area light source by a shadow caster onto the shadow acceptor;
for each respective one of the plurality of pixels:
calculating a radius for a filter for each of the plurality of pixels based on the shadow information in the penumbra map for the respective pixel, wherein the radius calculated for one of the pixels is different from the radius for a different one of the pixels;
applying the filter to the shadow information for one or more of the plurality of pixels to determine shadow density for the respective pixel, wherein the one or more of the plurality of pixels are within the calculated radius from the respective pixel; and
using the shadow density for the respective pixel in one or more lighting calculations to render the respective pixel.

2. The method of claim 1, wherein said generating the penumbra map further comprises constructing a logical plane through the light source that is parallel to a plane of the shadow caster, wherein for each respective one of the plurality of pixels, the distance included in the shadow information is a distance from a point on the logical plane through the light source to a point on the shadow caster along a line between the point on the logical plane and the respective one of the plurality of pixels.

3. The method of claim 2, wherein the light source is spherical and wherein the logical plane passes through the center of the light source.

4. The method of claim 1, wherein said calculating a radius comprises dividing a product of a radius of the light source and a distance between the shadow caster and the shadow acceptor by a distance between the light source and the shadow caster.

5. The method of claim 1, wherein the distance included in the shadow information for each of the plurality of pixels comprises a distance from the center of the light source to a point on the shadow caster along a line traveled by light from the light source to the respective pixel.

6. The method of claim 5, wherein the distance from the light source to the point on the shadow caster corresponds to a distance between the light source and a point on a logical plane approximating a plane of the shadow caster, wherein the logical plane is parallel to a plane of the shadow acceptor.

7. The method of claim 1, wherein the filter comprises a box filter.

8. The method of claim 1, wherein said applying the filter comprises determining an average shadow density for the respective pixel according to the respective shadow information for the one or more of the plurality of pixels.

9. The method of claim 1, wherein the shadow caster and shadow acceptor comprise planar image data.

10. The method of claim 1, wherein said applying the filter comprises determining an average shadow density for the respective pixel according to the respective shadow information for the one or more of the plurality of pixels.

11. A system, comprising:
a graphics processing unit (GPU) and memory coupled to the GPU;
wherein the memory comprises program instructions executable on the GPU to:
generate a penumbra map including shadow information regarding a plurality of pixels of a shadow acceptor, wherein the shadow information includes, for each of the plurality of pixels, a distance from a light source to a point on a shadow caster along a line traveled by light from the light source to the respective pixel, wherein the respective distance for each of the plurality of pixels indicates whether the pixel is in a shadow formed by attenuation of light from an area light source by a shadow caster onto the shadow acceptor;
for each respective one of the plurality of pixels:
calculate a radius for a filter for each of the plurality of pixels based on the shadow information in the penumbra map for the respective pixel, wherein the radius calculated for one of the pixels is different from the radius for a different one of the pixels;
apply the filter to the shadow information for one or more of the plurality of pixels to determine shadow density for the respective pixel, wherein the one or more of the plurality of pixels are within the calculated radius from the respective pixel; and
use the shadow density for the respective pixel in one or more lighting calculations to render the respective pixel.

12. The system of claim 11, wherein said generating the penumbra map further comprises constructing a logical plane through the light source that is parallel to a plane of the shadow caster, wherein for each respective one of the plurality of pixels, the distance included in the shadow information is a distance from a point on the logical plane through the light source to a point on the shadow caster along a line between the point on the logical plane and the respective one of the plurality of pixels.

13. The system of claim 12, wherein the light source is spherical and wherein the logical plane passed through the center of the light source.

14. The system of claim 11, wherein said calculating a radius comprises dividing a product of a radius of the light source and a distance between the shadow caster and the shadow acceptor by the distance between the light source and the shadow caster.

15. The system of claim 11, wherein the distance included in the shadow information for each of the plurality of pixels comprises a distance from the center of the light source to a point on the shadow caster along a line traveled by light from the light source to the respective pixel.

16. The system of claim 15, wherein the distance from the light source to the point on the shadow caster corresponds to a distance between the light source and a point on a logical plane approximating a plane of the shadow caster, wherein the logical plane is parallel to a plane of the shadow acceptor.

17. The system of claim 11, wherein the filter comprises a box filter.

18. The system of claim 11, wherein to apply the filter, the program instructions are further executable to determine an average shadow density for the respective pixel according to the respective shadow information for the one or more of the plurality of pixels.

19. A computer-readable storage medium, comprising program instructions executable to implement:
generating a penumbra map including shadow information regarding a plurality of pixels of a shadow acceptor, wherein the shadow information includes, for each of the plurality of pixels, a distance from a light source to a point on a shadow caster along a line traveled by light from the light source to the respective pixel, wherein the respective distance for each of the plurality of pixels indicates whether the pixel is in a shadow formed by attenuation light from an area light source by a shadow caster onto the shadow acceptor;
for each respective one of the plurality of pixels:
calculating a radius for a filter for each of the plurality of pixels based on the shadow information in the penumbra map for the respective pixel, wherein the radius calculated for one of the pixels is different from the radius for a different one of the pixels;
applying the filter to the shadow information for one or more of the plurality of pixels to determine shadow density for the respective pixel, wherein the one or more of the plurality of pixels are within the calculated radius from the respective pixel; and
using the shadow density for the respective pixel in one or more lighting calculations to render the respective pixel.

20. The medium of claim 19, wherein said calculating a radius comprises dividing a product of a radius of the light source and a distance between the shadow caster and the shadow acceptor by a distance between the light source and the shadow caster.

* * * * *